United States Patent
Rathi et al.

(10) Patent No.: US 8,872,969 B1
(45) Date of Patent: Oct. 28, 2014

(54) DYNAMIC RELATIVE ADJUSTMENT OF A COLOR PARAMETER OF AT LEAST A PORTION OF A VIDEO FRAME/IMAGE AND/OR A COLOR PARAMETER OF AT LEAST A PORTION OF A SUBTITLE ASSOCIATED THEREWITH PRIOR TO RENDERING THEREOF ON A DISPLAY UNIT

(71) Applicant: NVIDIA Corporation, Santa Clara, CA (US)

(72) Inventors: Anup Rathi, Maharashtra (IN); Nilesh More, Maharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 14/016,258

(22) Filed: Sep. 3, 2013

(51) Int. Cl.
  *H04N 11/00* (2006.01)
  *H04N 9/76* (2006.01)
  *H04N 7/088* (2006.01)
  *G06T 11/00* (2006.01)

(52) U.S. Cl.
  CPC ............ *H04N 7/0882* (2013.01); *G06T 11/001* (2013.01)
  USPC ............................. 348/468; 348/599; 348/600

(58) Field of Classification Search
  USPC ......... 348/465, 468, 589, 598–600, 563, 564, 348/569, 566, 567
  IPC ................. H04N 7/00,11/00, 9/74, 9/76, 5/445, H04N 5/50
  See application file for complete search history.

(56) References Cited

U.S. PATENT DOCUMENTS

| 4,763,186 | A | 8/1988 | Belmares-Sarabia et al. |
| 4,989,080 | A | 1/1991 | Ito |
| 5,212,546 | A | 5/1993 | Arazi et al. |
| 8,018,494 | B2 | 9/2011 | Yokomitsu et al. |
| 8,139,157 | B2 | 3/2012 | Someya et al. |
| 2004/0133926 | A1* | 7/2004 | Numata ........................ 348/468 |
| 2007/0046822 | A1 | 3/2007 | Arisaka |
| 2007/0147510 | A1 | 6/2007 | Asad et al. |
| 2009/0040377 | A1* | 2/2009 | Kurahashi et al. ............ 348/468 |

FOREIGN PATENT DOCUMENTS

EP  2321819 A1  5/2011

* cited by examiner

*Primary Examiner* — Sherrie Hsia
(74) *Attorney, Agent, or Firm* — Zilka-Kotab, PC

(57) ABSTRACT

A method includes storing data related to a video frame or an image separately from data related to a subtitle of the video frame or the image in a memory of a data processing device, and comparing, through a processor communicatively coupled to the memory, a color parameter of the data related to the video frame or the image to a color parameter of the data related to the subtitle. The method also includes dynamically adjusting a color parameter of at least a portion of the data related to the subtitle and/or a color parameter of at least a portion of the data related to the video frame or the image based on the comparison. Further, the method includes overlaying the data related to the subtitle on the data related to the video frame or the image following the dynamic adjustment prior to rendering thereof on a display unit.

20 Claims, 7 Drawing Sheets

DYNAMIC RELATIVE ADJUSTMENT OF A COLOR PARAMETER OF AT LEAST A PORTION OF A VIDEO FRAME/IMAGE AND/OR A COLOR PARAMETER OF AT LEAST A PORTION OF A SUBTITLE ASSOCIATED THEREWITH PRIOR TO RENDERING THEREOF ON A DISPLAY UNIT

FIELD OF TECHNOLOGY

This disclosure relates generally to video/image post-processing and, more particularly, to dynamic relative adjustment of a color parameter of at least a portion of a video frame/image and/or a color parameter of at least a portion of a subtitle associated therewith prior to rendering thereof on a display unit.

BACKGROUND

A data processing device (e.g., a mobile phone, a desktop computer, a laptop computer, a notebook computer, a netbook, a smart television, a gaming console) may have a display unit on which video frames or images are rendered. For the convenience of a user of the data processing device, subtitles may be overlaid on the video frames or the images to enable the user comprehend audio content associated therewith. When color parameters (e.g., color brightness, color saturation) of the video frames or the images are comparable to those of the subtitles, the user may find it difficult to discern the video frame/image content and/or the subtitle content.

SUMMARY

Disclosed are a method, a device and/or a system of dynamic relative adjustment of a color parameter of at least a portion of a video frame/image and/or a color parameter of at least a portion of a subtitle associated therewith prior to rendering thereof on a display unit.

In one aspect, a method includes storing data related to a video frame or an image separately from data related to a subtitle of the video frame or the image in a memory of a data processing device, and comparing, through a processor communicatively coupled to the memory, a color parameter of the data related to the video frame or the image to a color parameter of the data related to the subtitle. The method also includes dynamically adjusting, through the processor, a color parameter of at least a portion of the data related to the subtitle and/or a color parameter of at least a portion of the data related to the video frame or the image based on the comparison. Further, the method includes overlaying, through the processor, the data related to the subtitle on the data related to the video frame or the image following the dynamic adjustment prior to rendering thereof on a display unit associated with the data processing device.

In another aspect, a non-transitory medium, readable through a data processing device and including instructions embodied therein that are executable through the data processing device, is disclosed. The non-transitory medium includes instructions to store data related to a video frame or an image separately from data related to a subtitle of the video frame or the image in a memory of the data processing device. The non-transitory medium also includes instructions to compare, through a processor communicatively coupled to the memory, a color parameter of the data related to the video frame or the image to a color parameter of the data related to the subtitle. Further, the non-transitory medium includes instructions to dynamically adjust, through the processor, a color parameter of at least a portion of the data related to the subtitle and/or a color parameter of at least a portion of the data related to the video frame or the image based on the comparison.

Still further, the non-transitory medium includes instructions to overlay, through the processor, the data related to the subtitle on the data related to the video frame or the image following the dynamic adjustment prior to rendering thereof on a display unit associated with the data processing device.

In yet another aspect, a data processing device includes a memory including data related to a video frame or an image stored separately from data related to a subtitle of the video frame or the image therein, and a processor communicatively coupled to the memory. The processor is configured to execute instructions to compare a color parameter of the data related to the video frame or the image to a color parameter of the data related to the subtitle, to dynamically adjust a color parameter of at least a portion of the data related to the subtitle and/or a color parameter of at least a portion of the data related to video frame or the image based on the comparison, and to overlay the data related to the subtitle on the data related to the video frame or the image following the dynamic adjustment prior to rendering thereof on a display unit associated with the data processing device.

The methods and systems disclosed herein may be implemented in any means for achieving various aspects, and may be executed in a form of a machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a device and/or a system of dynamic relative adjustment of a color parameter of at least a portion of a video frame/image and/or a color parameter of at least a portion of a subtitle associated therewith prior to rendering thereof on a display unit. Although the present embodiments have been described with reference to specific example embodiments, it will be evident that various modifications and changes may be made to these embodiments without departing from the broader spirit and scope of the various embodiments.

Figure 1:
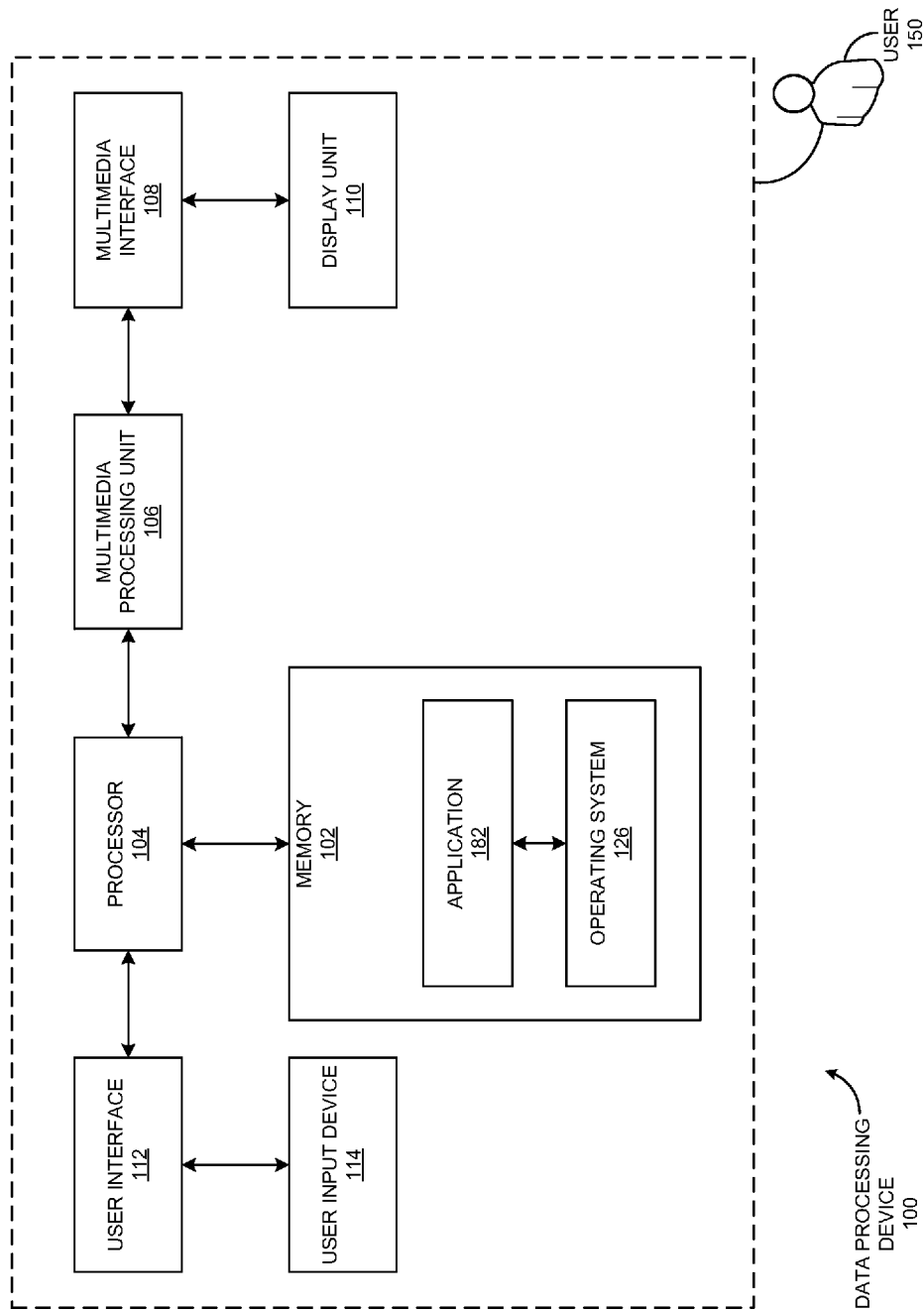
FIG. 1 is a schematic view of a data processing device, according to one or more embodiments.

FIG. 1 shows a data processing device 100, according to one or more embodiments. In one or more embodiments, data processing device 100 may be a mobile device such as a mobile phone, a desktop computer, a laptop computer, a notebook computer, a netbook, a smart television or a gaming console on which a user 150 may execute/play games available on non-transitory machine-readable media such as Compact Discs (CDs), Digital Video Discs (DVDs), Blu-Ray® discs and gaming cartridges, or on downloaded files stored in a memory 102 (e.g., non-volatile memory) of data processing device 100.

In one or more embodiments, memory 102 of data processing device 100 may be a volatile memory (e.g., Random Access Memory (RAM)) and/or a non-volatile memory (e.g., Read-Only Memory (ROM), hard disk). In one or more embodiments, at least some portion of memory 102 (e.g., ROM) may be part of a processor 104 of data processing device 100. In one or more embodiments, processor 104 may include a Central Processing Unit (CPU) and/or a Graphics Processing Unit (GPU). In another embodiment, memory 102 may be separate from processor 104. In general, in one or more embodiments, processor 104 may be communicatively coupled to memory 102; memory 102 may include storage locations configured to be addressable through processor 104.

In one or more embodiments involving a GPU, the GPU may be configured to perform intensive graphics processing. Alternately, two or more GPUs may be provided in data processing device 100 to perform the abovementioned graphics processing. In one or more embodiments, when data processing device 100 is powered ON, instructions associated with loading an operating system 126 thereon stored in memory 102 (e.g., non-volatile memory) may be executed through processor 104.

In one or more embodiments, output data associated with processing through processor 104 may be input to a multimedia processing unit 106 configured to perform encoding/decoding associated with the data. In one or more embodiments, the output of multimedia processing unit 106 may be rendered on a display unit 110 through a multimedia interface 108 configured to convert data to an appropriate format required by display unit 110. In one or more embodiments, display unit 110 may be a computer monitor/display (e.g., Liquid Crystal Display (LCD), Cathode Ray Tube (CRT) display) associated with data processing device 100. In an alternate embodiment, display unit 110 may also be a monitor/display embedded in the gaming console.

In one or more embodiments, a user interface 112 (e.g., a game port, a Universal Serial Bus (USB) port) interfaced with processor 104 may be provided in data processing device 100 to enable coupling of a user input device 114 to processor 104 therethrough. In one or more embodiments, user input device 114 may include a keyboard/keypad and/or a pointing device (e.g., mouse, touch pad, trackball). In one or more embodiments, user input device 114 may also include a joystick or a gamepad.

Figure 2:
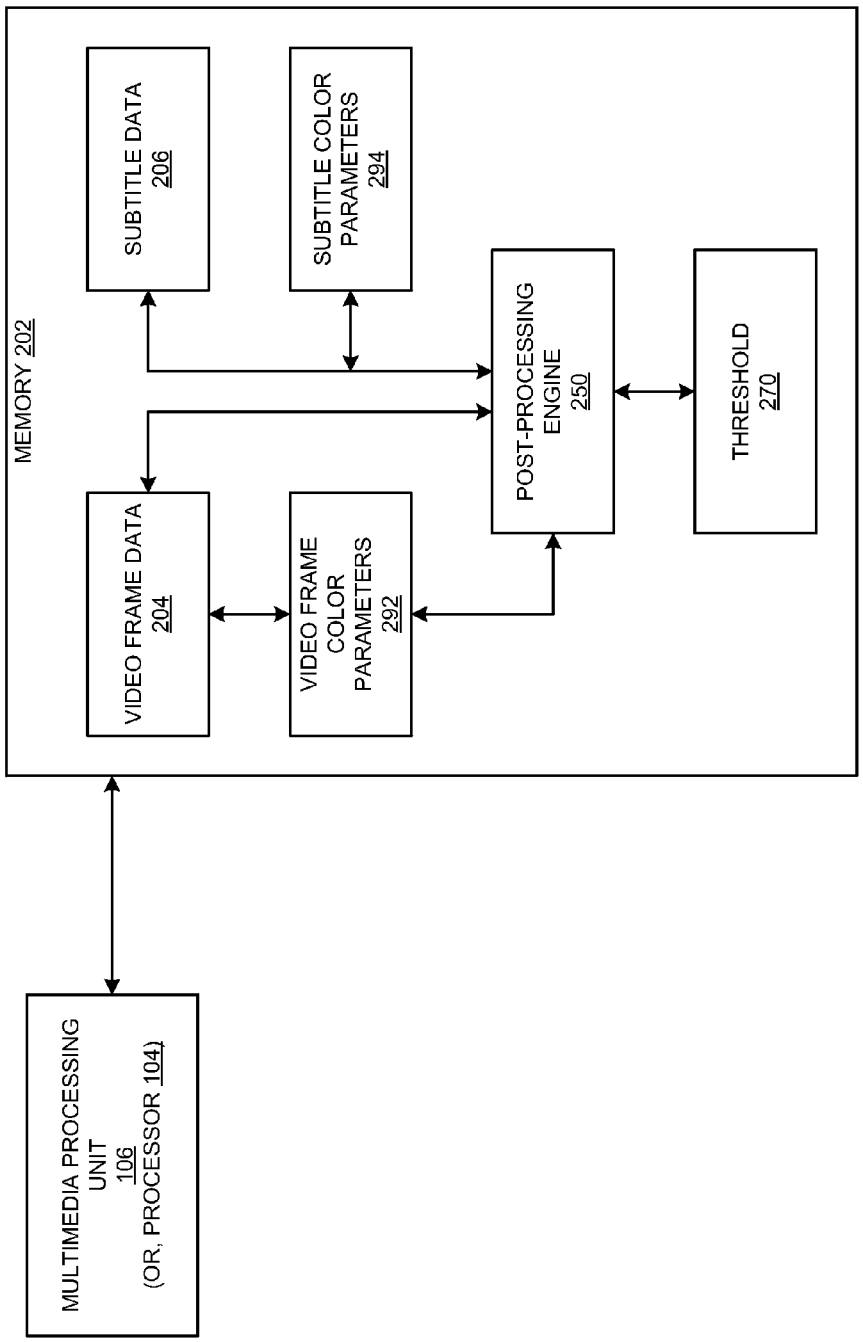
FIG. 2 is a schematic view of a multimedia processing unit of the data processing device of FIG. 1 and a memory associated therewith, according to one or more embodiments.

In an example scenario, a movie (or, a game) may be rendered on display unit 110 of data processing device 100. The movie may include video frames onto which subtitles may be overlaid (e.g., through multimedia processing unit 106; it should be noted that multimedia processing unit 106 may be processor 104 or, distinct from processor 104). FIG. 2 shows multimedia processing unit 106 and a memory 202 (e.g., same as memory 102 or, a different memory) associated therewith. Although not limiting, memory 202 here may, preferably, be a volatile memory. Memory 202 is shown to include video frame data 204 (obviously, data related to one or more video frames to be rendered) and subtitle data 206 (obviously, data related to one or more subtitles to be overlaid on the corresponding one or more video frames); video frame data 204 and subtitle data 206 may be stored in memory 202 separately. The aforementioned frame data 204 and subtitle data 206 may be combined (e.g., overlaid) through multimedia processing unit 106 (or, processor 104) and rendered on display unit 110.

Figure 3:
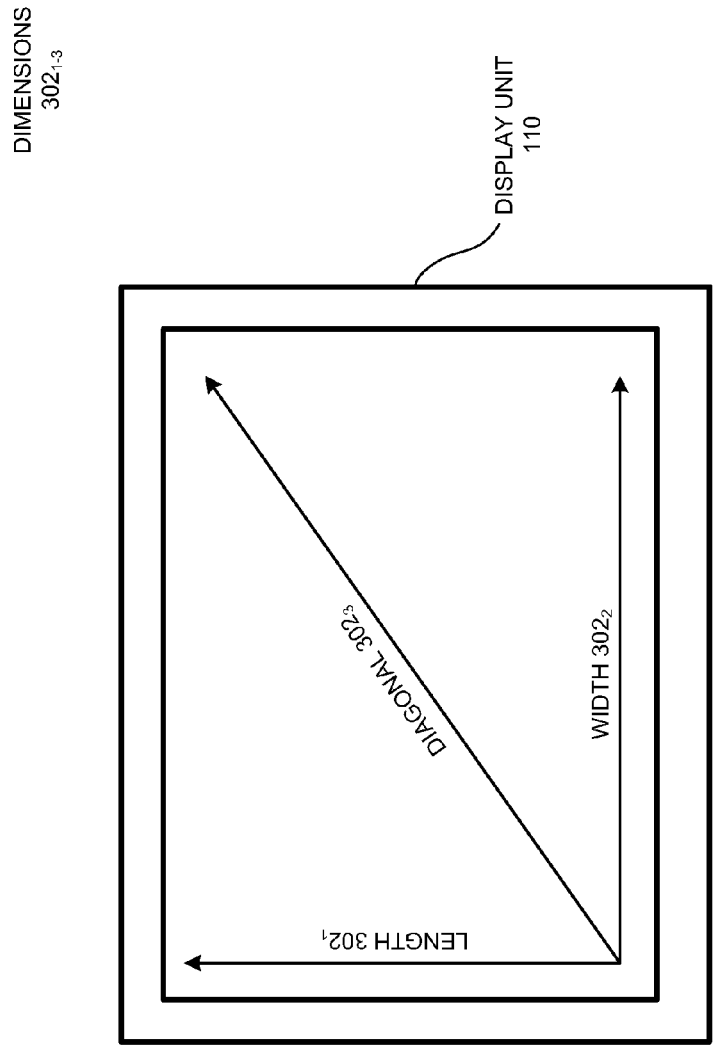
FIG. 3 is a schematic view of the display unit of the data processing device of FIG. 1 and dimensions thereof.

Subtitles may be employed to enable user 150 comprehend audio content associated with the movie rendered on display unit 110. For example, user 150 may face difficulty in understanding the language, comprehending the dialect thereof or comprehending the speed of speech associated with the audio content. In another example, user 150 may a hearing impaired person. The subtitles may aid user 150 overcome the language barrier and/or interpret the speech/audio content associated with the movie. The subtitles may be generally rendered at a bottom of a screen associated with display unit 110. FIG. 3 shows display unit 110 and dimensions $302_{1-3}$ (e.g., length, width, diagonal; other representative dimensions are also possible) thereof. In one or more embodiments, dimensions $302_{1-3}$ may be made available in a driver component (not shown) associated with display unit 110 and/or processor 104.

In one or more embodiments, based on dimensions $302_{1-3}$ (e.g., defined in the driver component), operating system 126 executing on data processing device 100 may be configured to provide a virtual display canvas (to be discussed in FIG. 3) on which a video content associated with video frame data 204 of FIG. 2 is placed (e.g., through processor 104); also, a subtitle content associated with subtitle data 206 of FIG. 2 may also be overlaid (e.g., again, through processor 104) on the video content. In one or more embodiments, the driver component may also include definition(s) related to placement of the subtitle content on the virtual display canvas provided through operating system 126. Alternately (or, additionally), in one or more embodiments, processor 104 may determine the placement of the subtitle content on the virtual display canvas.

Figure 4:
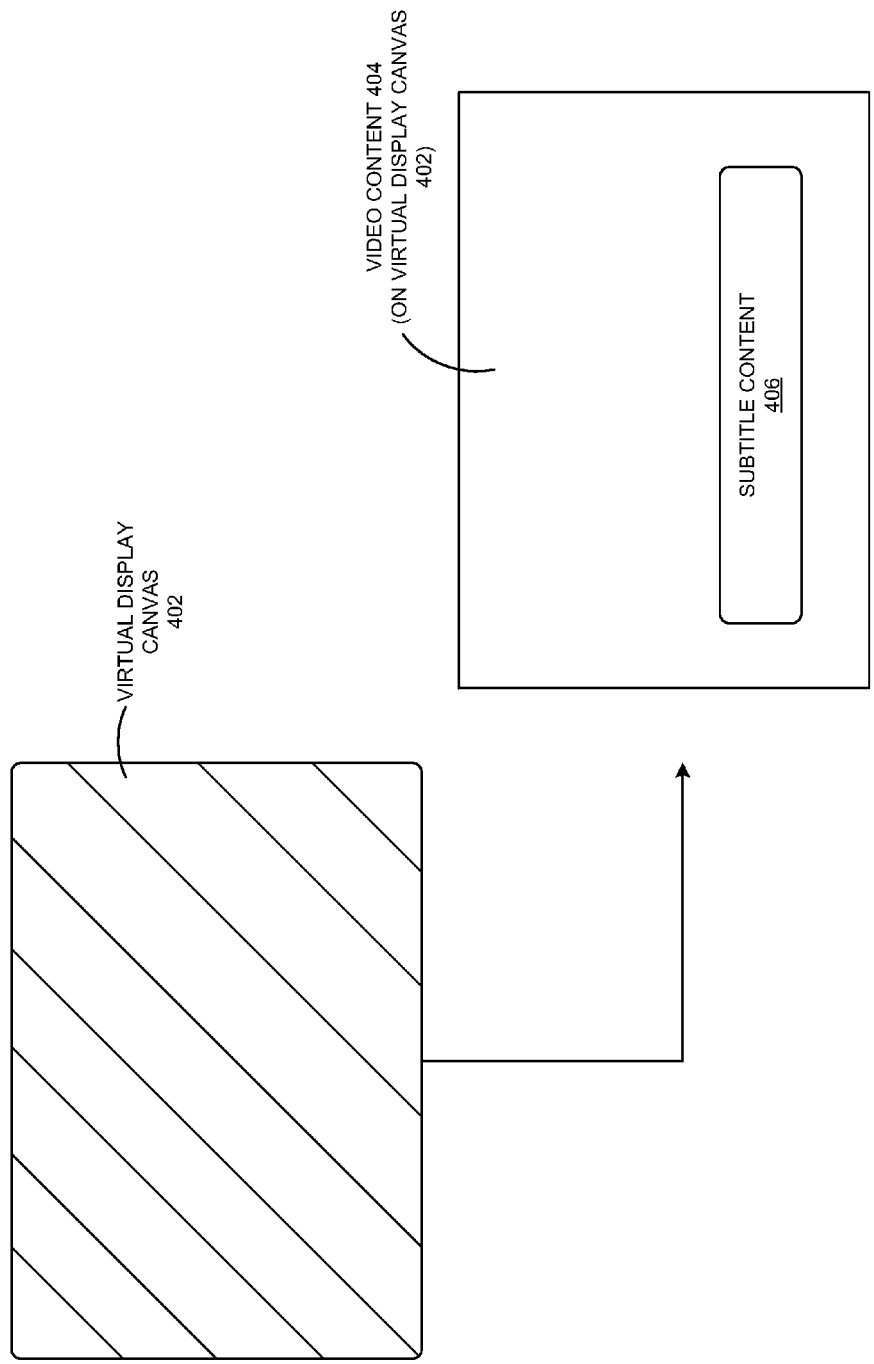
FIG. 4 is a schematic view of a virtual display canvas associated with the display unit of FIG. 1 providing through an operating system executing on the data processing device of FIG. 1.

FIG. 4 shows a virtual display canvas 402 associated with display unit 110 provided through operating system 126. FIG. 4 also shows a video content 404 associated with video frame data 204 of FIG. 2 and a subtitle content 406 associated with subtitle data 206 of FIG. 2 appropriately placed on virtual display canvas 402. When color parameters (e.g., color brightness, color contrast) of video content 404 and subtitle content 406 are comparable, user 150 may find it difficult to discern subtitle content 406. Similarly, user 150 may find it difficult to discern video content 404 close to subtitle content 406 when the color parameters are comparable. Exemplary embodiments provide for a means to adjust color parameters of video frame data 204 and/or subtitle data 206 such that video content 404 and/or subtitle content 406 are comfortably discernible by user 150.

In FIG. 2, memory 202 is shown as including a post-processing engine 250 (e.g., a set of instructions) to be executed through processor 104 (or, multimedia processing unit 106); said post-processing engine 250 may be configured to execute instructions to perform processing on subtitle data 206 and/or video frame data 204 to render subtitle content 406 and/or video content 404 comfortably discernible by user 150. In one or more embodiments, processor 104 may execute post-processing engine 250 to dynamically compare color parameters (e.g., video frame color parameters 292 and subtitle color parameters 294 shown in memory 202 of FIG. 2) of subtitle data 206 and video frame data 204. For example, processor 104 may calculate an average luma value of video frame data 204 and modify/apply one or more luma value(s) to subtitle data 206 to provide for an appropriate contrast. Alternately (or, additionally), processor 104 may calculate an average luma value of subtitle data 206 and modify/apply one or more luma value(s) to video frame data 204 to provide for the appropriate contrast.

FIG. 2 also shows memory 202 as including a threshold 270 associated with a difference between luma values of video frame data 204 and subtitle data 206. If processor 104 determines the average luma value of video frame data 204 (or, subtitle data 206) to be less than threshold 270, processor 104 may be configured to dynamically apply one or more luma value(s) to subtitle data 206 (or, video frame data 204) to provide for appropriate contrast. It is obvious that the modification or adjustment of color parameters of video frame data 204 and/or subtitle data 206 may not be limited to luma values. Other color parameters such as color saturation, color depth and color temperature are also within the scope of the exemplary embodiments discussed herein. Further, it is obvious that the adjustment/modification of the color parameters of video frame data 204 and/or subtitle data 206 may be such that the difference between the color parameter of video frame data 204 and the color parameter of subtitle data 206 exceeds threshold 270.

It should also be noted that one or more color parameter(s) of a portion of subtitle data 206 (e.g., text, background of text) and/or video frame data 204 may solely be modified/adjusted instead of the performing the modification/adjustment on the entire subtitle data 206 and/or video frame data 204. The aforementioned selective application/modification may be enabled through the execution of post-processing engine 250 on processor 104 (or, multimedia processing unit 106). Following the modification, subtitle data 206 may be overlaid on video frame data 204 prior to rendering thereof on display unit 110.

In one or more embodiments, user 150 may be provided a capability to trigger the color parameter modification process; the triggering may be possible through a physical button associated with data processing device 100 or display unit 110, clicking/touching a virtual button/interface on display unit 110, executing an appropriate application (e.g., application 182 shown as being stored in memory 102 of FIG. 1) therefor and/or loading of operating system 126. In the case of loading of operating system 126, the triggering may be an automatic process going on in the background or foreground. Other forms of triggering are within the scope of the exemplary embodiments discussed herein.

In one or more embodiments, memory 102 may have predefined threshold values for comparison between video frame data 204 and subtitle data 206; the aforementioned values may be utilized through the instructions provided as part of post-processing engine 250 executing on processor 104 (or, multimedia processing unit 106). For example, processor 104 may be configured to determine that the color wavelengths of a background (e.g., corresponding to red color) provided by video frame data 204 and a background (e.g., corresponding to orange color) provided by subtitle data 206 are comparable. Following the determination, appropriate post-processing may be performed on video frame data 204 and/or subtitle data 206 to dynamically provide for color wavelength contrast therebetween.

Figure 5:
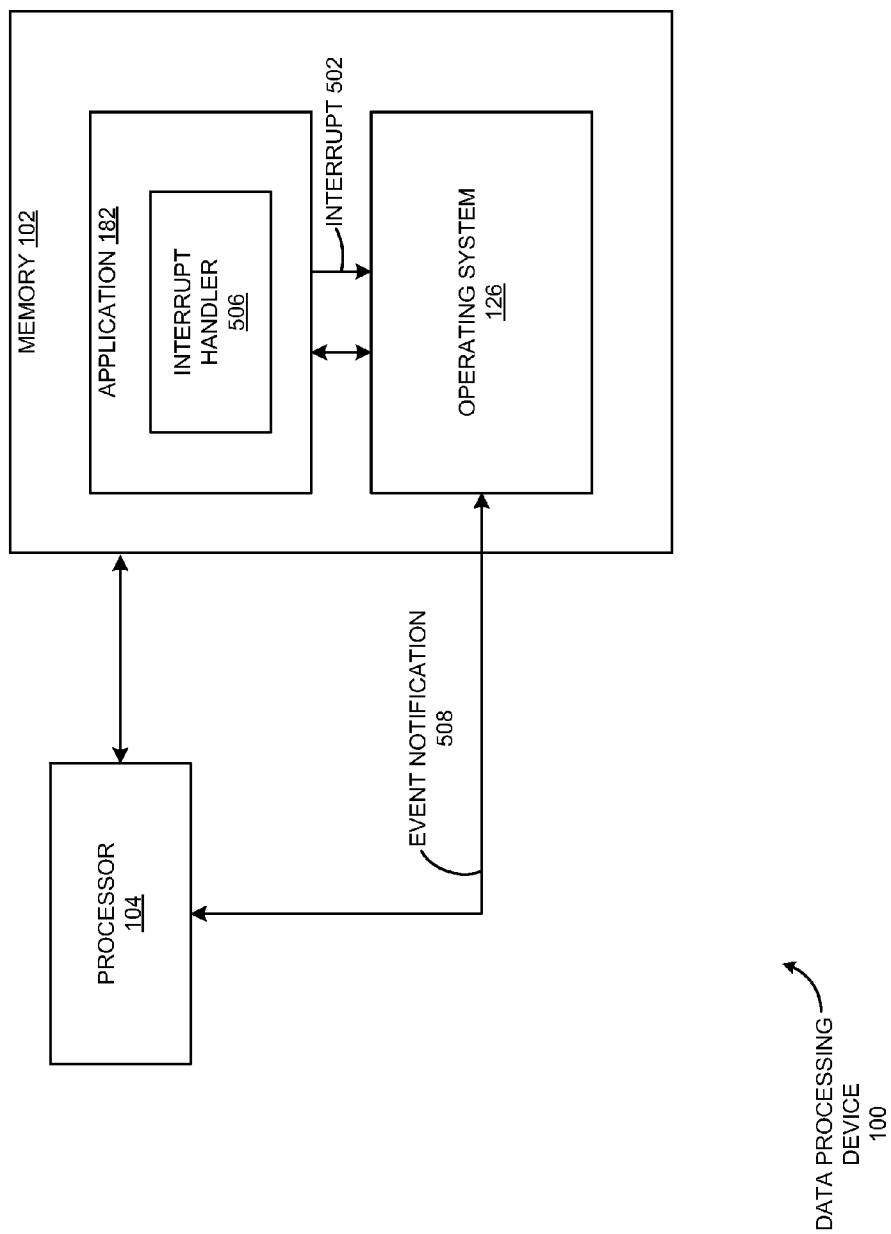
FIG. 5 is an illustrative view of triggering of relative color parameter modification/adjustment between video frame data and subtitle data stored in a memory of the data processing device of FIGS. 1-2, according to one or more embodiments.

FIG. 5 illustrates triggering of the color parameter modification/adjustment process discussed above, according to one or more embodiments. In one or more embodiments, the color parameter modification/adjustment process may be amenable for implementation in an example application 182 such as NVIDIA®'s Control Panel (NVCPL) for GPUs and Media and Communications Processors (MCPs). When user 150 triggers the color parameter modification/adjustment process through a physical button or a virtual interface (e.g., an interface provided through application 182) of data processing device 100, an application associated therewith (e.g., application 182) may be configured to generate an interrupt 502 to operating system 126. In one or more embodiments, the application and/or operating system 126 may include an interrupt handler 506 to handle said interrupt 502.

FIG. 5 shows interrupt handler 506 as being implemented in application 182. Operating system 126 may then generate an event notification 508 that is detected through processor 104. Other forms of interpretation of the triggering are also within the scope of the exemplary embodiments discussed herein. Once the triggering is detected through processor 104 based on event notification 508, processor 104 may be configured to execute post-processing engine 250 discussed above to perform the color parameter comparison and the subsequent modification/adjustment.

Figure 6:
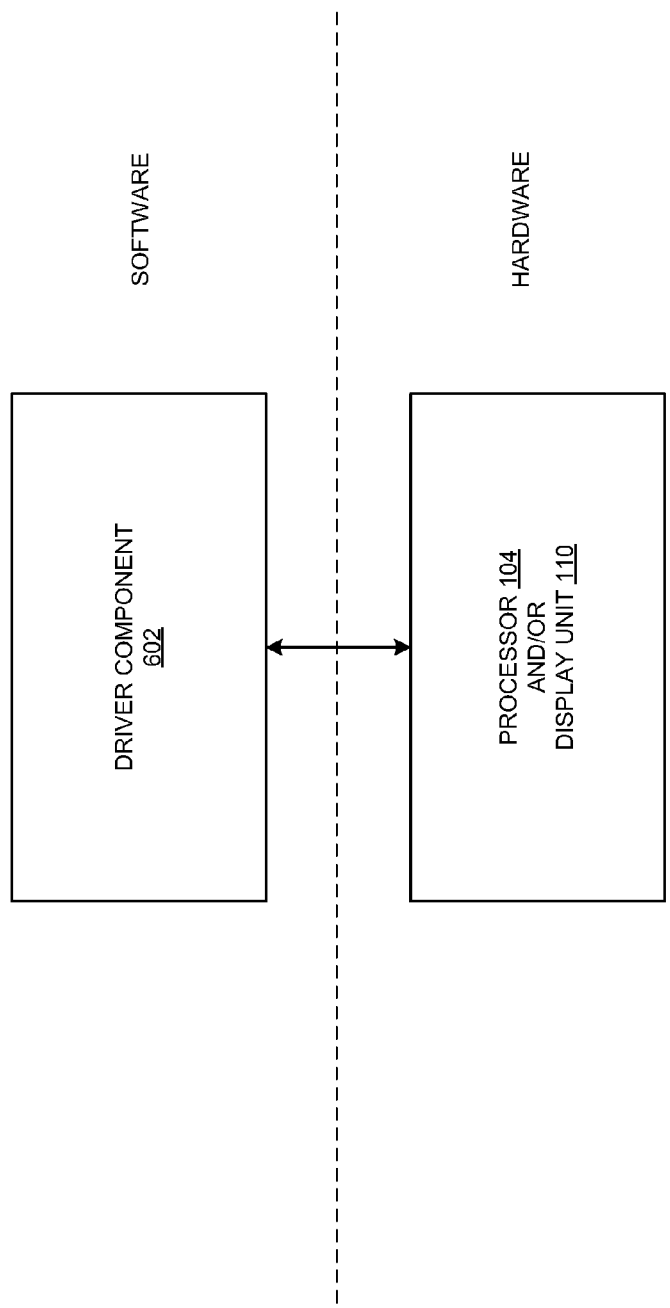
FIG. 6 is a schematic view of interaction between a driver component and a processor and/or the display unit of the data processing device of FIG. 1, according to one or more embodiments.

Thus, exemplary embodiments provide a capability to user 150 to discern content rendered on display unit 110. Exemplary embodiments also dispense with a requirement of providing a contrasting element such as a black rectangle around the subtitles to enable user 150 discern the content better. FIG. 6 shows interaction between a driver component 602 and processor 104 and/or display unit 110, according to one or more embodiments. As discussed above, driver component 602 may include dimensional parameters of display unit 110 and/or positional information of the subtitles on virtual display canvas 402 stored (or, made available) therein. Upon the triggering of the color parameter comparison process, processor 104 may enable execution of instructions provided in driver component 602 to extract requisite parameters. In one or more embodiments, the extracted parameters may be utilized in the color parameter comparison process. Optionally, in one or more embodiments, driver component 602 may trigger the modification/adjustment of the color parameters through processor 104 based on the comparison.

In one or more embodiments, instructions associated with driver component 602 and/or post-processing engine 250 may be stored in memory 102 to be installed on data processing device 100 after, say, a download through the Internet. Alternately, an external memory may be utilized therefor. Also, instructions associated with driver component 602 and/or post-processing engine 250 may be embodied on a non-transitory medium readable through data processing device 100 such as a Compact Disc (CD), a Digital Video Disc (DVD), a Blu-ray Disc®, a hard disk a floppy disk, or a diskette etc. The aforementioned instructions may be executable through data processing device 100. In one or more embodiments, driver component 602 may be packaged with operating system 126 and/or application 182.

While exemplary embodiments have been discussed with reference to video frames and subtitles associated therewith, images may also have subtitles associated therewith. Therefore, dynamic adjustment/modification of color parameters of images and/or subtitles thereof are also within the scope of the exemplary embodiments discussed herein.

Figure 7:
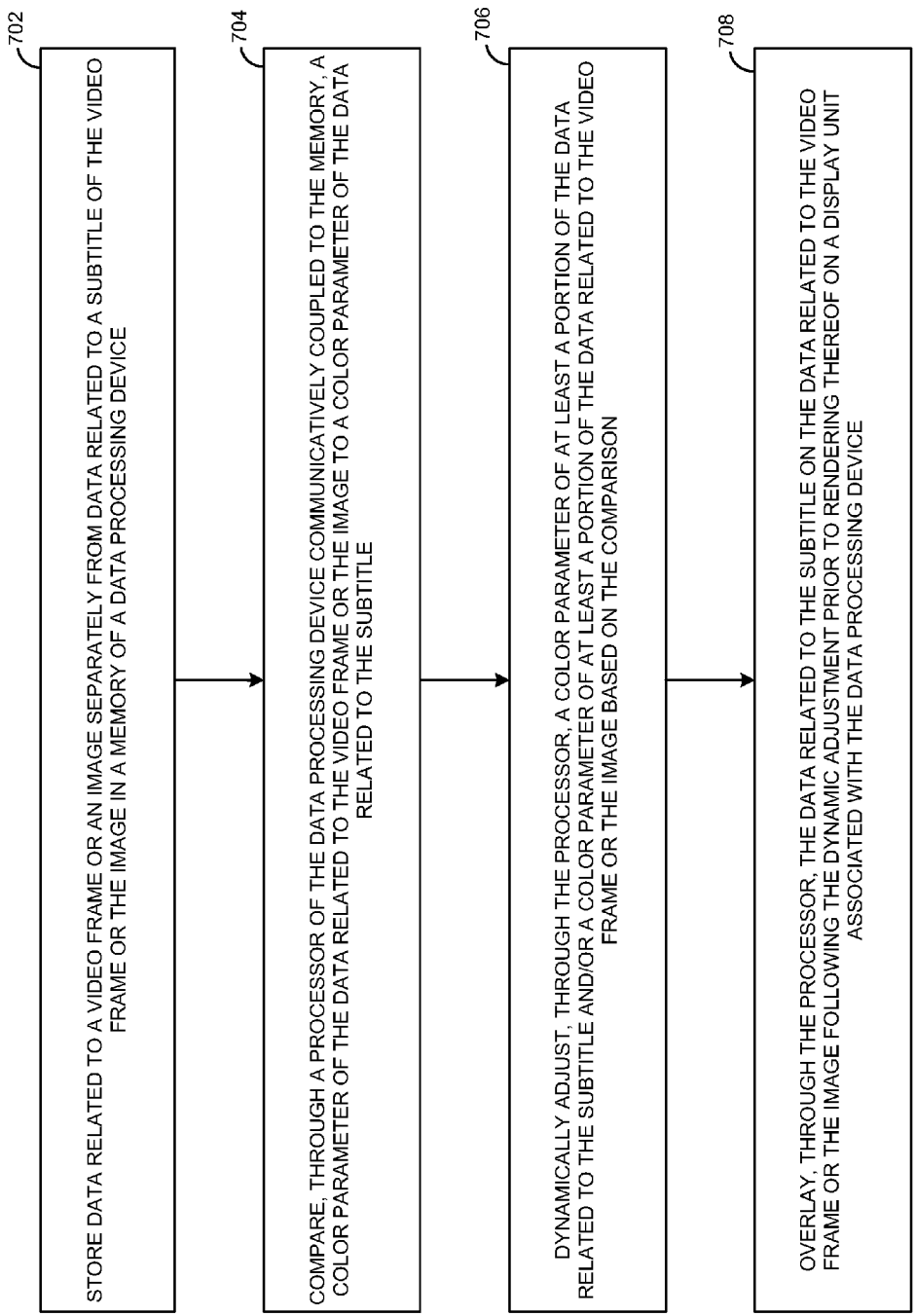
FIG. 7 is a process flow diagram detailing the operations involved in dynamic relative adjustment of a color parameter of at least a portion of a video frame/image and/or a color parameter of at least a portion of a subtitle associated therewith prior to rendering thereof on the display unit of the data processing device of FIG. 1, according to one or more embodiments.

FIG. 7 shows a process flow diagram detailing the operations involved in dynamic relative adjustment of a color parameter of at least a portion of a video frame/image and/or a color parameter of at least a portion of a subtitle associated therewith prior to rendering thereof on display unit 110, according to one or more embodiments. In one or more embodiments, operation 702 may involve storing data related to a video frame (e.g., video frame data 204) or an image separately from data related to a subtitle (e.g., subtitle data 206) of the video frame or the image in memory 102. In one or more embodiments, operation 704 may involve comparing, through processor 104, a color parameter of the data related to the video frame or the image to a color parameter of the data related to the subtitle. In one or more embodiments, operation 706 may involve dynamically adjusting, through processor 104, a color parameter of at least a portion of the data related to the subtitle (e.g., text and/or background of the text) and/or a color parameter of at least a portion of the data related to the video frame or the image based on the comparison.

In one or more embodiments, operation 708 may then involve overlaying, through processor 104, the data related to the subtitle on the data related to the video frame or the image following the dynamic adjustment prior to rendering thereof on display unit 110.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a non-transitory machine-readable medium). For example, the various electrical structures and methods may be embodied using transistors, logic gates, and electrical circuits (e.g., Application Specific Integrated Circuitry (ASIC) and/or Digital Signal Processor (DSP) circuitry).

In addition, it will be appreciated that the various operations, processes, and methods disclosed herein may be embodied in a non-transitory machine-readable medium and/or a machine accessible medium compatible with a data processing system (e.g., data processing device 100), and may be performed in any order (e.g., including using means for achieving the various operations). Accordingly, the specification and drawings are to be regarded in an illustrative rather than a restrictive sense.

What is claimed is:

1. A method comprising:
    storing data related to one of a video frame and an image separately from data related to a subtitle of the one of the video frame and the image in a memory of a data processing device;
    comparing, through a processor of the data processing device communicatively coupled to the memory, a color parameter of the data related to the one of the video frame and the image to a color parameter of the data related to the subtitle;
    dynamically adjusting, through the processor, at least one of: a color parameter of at least a portion of the data related to the subtitle and a color parameter of at least a portion of the data related to the one of the video frame and the image based on the comparison; and
    overlaying, through the processor, the data related to the subtitle on the data related to the one of the video frame and the image following the dynamic adjustment prior to rendering thereof on a display unit associated with the data processing device.

2. The method of claim 1, comprising triggering the comparison and the dynamic adjustment through at least one of: a physical button associated with one of: the data processing device and the display unit, a virtual interface associated with the display unit, an application executing on the data processing device and loading of an operating system executing on the data processing device.

3. The method of claim 2, further comprising:
    generating, through the application, an interrupt to the operating system executing on the data processing device in accordance with the triggering;
    handling the interrupt through at least one of the application and the operating system;
    generating, through the operating system, an event notification following the handling of the interrupt; and
    detecting, through the processor, the event notification generated to enable commencing of the comparison of the color parameters.

4. The method of claim 2, further comprising:
    defining dimensional parameters of the display unit in a driver component;
    providing, through the operating system executing on the data processing device, a virtual display canvas on which the data related to the one of the video frame and the image and the data related to the subtitle are placed; and
    one of: defining placement of the data related to the subtitle on the virtual display canvas through the driver component and determining the placement of the data related to the subtitle on the virtual display canvas through the processor.

5. The method of claim 4, comprising packaging the driver component with at least one of: the operating system executing on the data processing device and the application executing on the data processing device.

6. The method of claim 1, comprising comparing the color parameter of the data related to the one of the video frame and the image to the color parameter of the data related to the subtitle based on a threshold stored in the memory.

7. The method of claim 1, comprising performing the color parameter comparison and the dynamic adjustment thereof through the processor as part of a post-processing operation on the data related to the one of the video data and the image and the data related to the subtitle.

8. A non-transitory medium, readable through a data processing device and including instructions embodied therein that are executable through the data processing device, comprising:
    instructions to store data related to one of a video frame and an image separately from data related to a subtitle of the one of the video frame and the image in a memory of the data processing device;
    instructions to compare, through a processor of the data processing device communicatively coupled to the memory, a color parameter of the data related to the one of the video frame and the image to a color parameter of the data related to the subtitle;

instructions to dynamically adjust, through the processor, at least one of: a color parameter of at least a portion of the data related to the subtitle and a color parameter of at least a portion of the data related to the one of the video frame and the image based on the comparison; and instructions to overlay, through the processor, the data related to the subtitle on the data related to the one of the video frame and the image following the dynamic adjustment prior to rendering thereof on a display unit associated with the data processing device.

9. The non-transitory medium of claim 8, comprising instructions to trigger the comparison and the dynamic adjustment through at least one of: a physical button associated with one of: the data processing device and the display unit, a virtual interface associated with the display unit, an application executing on the data processing device and loading of an operating system executing on the data processing device.

10. The non-transitory medium of claim 9, further comprising instructions to:
generate, through the application, an interrupt to the operating system executing on the data processing device in accordance with the triggering;
handle the interrupt through at least one of the application and the operating system;
generate, through the operating system, an event notification following the handling of the interrupt; and
detect, through the processor, the event notification generated to enable commencing of the comparison of the color parameters.

11. The non-transitory medium of claim 9, further comprising:
instructions to define dimensional parameters of the display unit in a driver component;
instructions to provide, through the operating system executing on the data processing device, a virtual display canvas on which the data related to the one of the video frame and the image and the data related to the subtitle are placed; and
instructions to one of: define placement of the data related to the subtitle on the virtual display canvas through the driver component and determine the placement of the data related to the subtitle on the virtual display canvas through the processor.

12. The non-transitory medium of claim 11, comprising instructions compatible with the driver component packaged with at least one of: the operating system executing on the data processing device and the application executing on the data processing device.

13. The non-transitory medium of claim 8, comprising instructions to compare the color parameter of the data related to the one of the video frame and the image to the color parameter of the data related to the subtitle based on a threshold stored in the memory.

14. A data processing device comprising:
a memory comprising data related to one of a video frame and an image stored separately from data related to a subtitle of the one of the video frame and the image therein; and
a processor communicatively coupled to the memory, the processor being configured to execute instructions to:

compare a color parameter of the data related to the one of the video frame and the image to a color parameter of the data related to the subtitle,
dynamically adjust at least one of: a color parameter of at least a portion of the data related to the subtitle and a color parameter of at least a portion of the data related to the one of the video frame and the image based on the comparison, and
overlay the data related to the subtitle on the data related to the one of the video frame and the image following the dynamic adjustment prior to rendering thereof on a display unit associated with the data processing device.

15. The data processing device of claim 14, wherein the comparison and the dynamic adjustment are triggered through at least one of: a physical button associated with one of: the data processing device and the display unit, a virtual interface associated with the display unit, an application executing on the data processing device and loading of an operating system executing on the data processing device.

16. The data processing device of claim 15, wherein:
the application is configured to generate an interrupt to the operating system executing on the data processing device in accordance with the triggering,
the interrupt is configured to be handled through at least one of the application and the operating system,
the operating system is configured to generate an event notification following the handling of the interrupt, and
the processor is configured to detect the event notification generated to enable commencing of the comparison of the color parameters.

17. The data processing device of claim 15, wherein:
dimensional parameters of the display unit are configured to be defined in a driver component,
the operating system executing on the data processing device is configured to provide a virtual display canvas on which the data related to the one of the video frame and the image and the data related to the subtitle are placed, and
one of: placement of the data related to the subtitle on the virtual display canvas is defined through the driver component and the placement of the data related to the subtitle on the virtual display canvas is determined through the processor.

18. The data processing device of claim 17, wherein the driver component is packaged with at least one of: the operating system executing on the data processing device and the application executing on the data processing device.

19. The data processing device of claim 14,
wherein the memory further comprises a threshold stored therein, and
wherein the processor is configured to execute instructions to compare the color parameter of the data related to the one of the video frame and the image to the color parameter of the data related to the subtitle based on the threshold stored in the memory.

20. The data processing device of claim 14, wherein the color parameter comparison and the dynamic adjustment thereof are performed through the processor as part of a post-processing operation on the data related to the one of the video data and the image and the data related to the subtitle.

* * * * *